United States Patent
Bancroft et al.

(10) Patent No.: US 12,214,234 B2
(45) Date of Patent: *Feb. 4, 2025

(54) DIRECT COUPLING COMPATIBLE SPRINKLER

(71) Applicant: Victaulic Company, Easton, PA (US)

(72) Inventors: Philip W. Bancroft, Belvidere, NJ (US); Daniel Wake, Bethlehem, PA (US); Ahmed Saleh, Nazareth, PA (US); Matthew A. Bowman, Palmer, PA (US); Craig Haney, Nazareth, PA (US)

(73) Assignee: VICTAULIC COMPANY, Easton, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/323,799

(22) Filed: May 25, 2023

(65) Prior Publication Data

US 2023/0293923 A1 Sep. 21, 2023

Related U.S. Application Data

(60) Continuation of application No. 16/663,439, filed on Oct. 25, 2019, now Pat. No. 11,701,534, which is a division of application No. 15/671,575, filed on Aug. 8, 2017, now Pat. No. 10,471,288.

(60) Provisional application No. 62/520,668, filed on Jun. 16, 2017, provisional application No. 62/448,105, filed on Jan. 19, 2017.

(51) Int. Cl.
| | |
|---|---|
| *A62C 35/68* | (2006.01) |
| *A62C 37/12* | (2006.01) |
| *A62C 37/14* | (2006.01) |
| *B05B 15/65* | (2018.01) |

(52) U.S. Cl.
CPC .............. *A62C 35/68* (2013.01); *A62C 37/12* (2013.01); *A62C 37/14* (2013.01); *B05B 15/65* (2018.02)

(58) Field of Classification Search
CPC ......... A62C 35/68; A62C 37/12; A62C 37/14; B05B 15/65
USPC .......................................................... 169/41
See application file for complete search history.

(56) References Cited

U.S. PATENT DOCUMENTS

| | | | |
|---|---|---|---|
| 1,607,943 | A | 11/1926 | Carson et al. |
| 1,659,470 | A | 2/1928 | Owen et al. |
| 4,073,514 | A | 2/1978 | Pate |
| 4,091,872 | A | 5/1978 | Mountford |
| 4,109,727 | A | 8/1978 | Job |
| 4,220,208 | A | 9/1980 | Jackson et al. |

(Continued)

FOREIGN PATENT DOCUMENTS

| | | |
|---|---|---|
| CA | 2817833 A1 | 8/2012 |
| CN | 2556454 Y | 6/2003 |

(Continued)

*Primary Examiner* — Chee-Chong Lee
(74) *Attorney, Agent, or Firm* — Ballard Spahr LLP

(57) ABSTRACT

A fire suppression sprinkler adapted to receive arcuate surfaces of a grooved coupling is retainable to the coupling in a pre-assembled state. The coupling joins the sprinkler in facing axial end-to-end relation directly to grooved pipe. The sprinkler has a monolithic body which defines a bore having an inlet and an outlet. A groove, positioned between the inlet and the outlet extends around the body. A gap between the inlet and the grooved pipe to ensure the sprinkler and the pipe are joined by the coupling spaced apart in facing end-to-end relationship.

14 Claims, 12 Drawing Sheets

(56) References Cited

U.S. PATENT DOCUMENTS

| | | |
|---|---|---|
| 4,258,795 A | 3/1981 | Hansen |
| 4,443,029 A | 4/1984 | Laxo |
| D283,486 S | 4/1986 | Fogel et al. |
| 4,639,020 A | 1/1987 | Rung et al. |
| 5,024,404 A | 6/1991 | Ballard |
| 5,109,929 A | 5/1992 | Spears |
| 5,169,177 A | 12/1992 | McLennan et al. |
| 5,188,185 A | 2/1993 | Mears |
| 5,221,113 A | 6/1993 | Stoll |
| 5,415,239 A | 5/1995 | Kotter et al. |
| 5,836,397 A | 11/1998 | Craig et al. |
| 6,340,059 B1 | 1/2002 | Bethea |
| 7,021,392 B2 | 4/2006 | Bentzien et al. |
| 7,516,800 B1 | 4/2009 | Silva, Jr. et al. |
| 7,591,055 B2 | 9/2009 | Gibb et al. |
| 7,712,796 B2 | 5/2010 | Gibb et al. |
| 7,766,092 B2 | 8/2010 | Perkovich et al. |
| 8,282,136 B2 | 10/2012 | Vandal et al. |
| 8,459,370 B2 | 6/2013 | Orr et al. |
| 8,550,502 B2 | 10/2013 | Vandal et al. |
| 8,615,865 B2 | 12/2013 | Vandal et al. |
| 8,662,191 B2 | 3/2014 | Orr et al. |
| 8,777,277 B2 | 7/2014 | Dole et al. |
| 9,039,046 B2 | 5/2015 | Beagen, Jr. |
| 9,194,516 B2 | 11/2015 | Beagen, Jr. |
| 9,239,123 B2 | 1/2016 | Vandal et al. |
| 9,278,238 B2 | 3/2016 | Thau, Jr. et al. |
| 9,297,482 B2 | 3/2016 | Vandal et al. |
| 9,297,484 B2 | 3/2016 | Beagen, Jr. |
| 9,388,922 B2 | 7/2016 | Dole |
| 9,427,610 B2 | 8/2016 | Ringer et al. |
| 9,500,307 B2 | 11/2016 | Beagen, Jr. |
| 9,504,864 B2 | 11/2016 | Cole, Jr. |
| 9,631,746 B2 | 4/2017 | Beagen, Jr. |
| 10,036,493 B2 | 7/2018 | Vandal et al. |
| 10,047,885 B2 | 8/2018 | Vandal et al. |
| 2003/0218079 A1 | 11/2003 | Zimhoni |
| 2004/0237632 A1 | 12/2004 | Van Keeken |
| 2005/0012329 A1 | 1/2005 | Brown |
| 2005/0236166 A1 | 10/2005 | Bentzien et al. |
| 2007/0187116 A1 | 8/2007 | Jackson et al. |
| 2009/0294138 A1 | 12/2009 | Jackson et al. |
| 2011/0214886 A1 | 9/2011 | Orr |
| 2012/0139236 A1 | 6/2012 | Novitsky et al. |
| 2013/0185919 A1 | 7/2013 | Beagen, Jr. |
| 2013/0240219 A1 | 9/2013 | Orr et al. |
| 2014/0096981 A1 | 4/2014 | Ringer et al. |
| 2014/0246852 A1 | 9/2014 | Gibb et al. |
| 2014/0374126 A1 | 12/2014 | Helasuo et al. |
| 2015/0021911 A1 | 1/2015 | Bowman et al. |
| 2015/0204471 A1 | 7/2015 | Sato |
| 2017/0328500 A1 | 11/2017 | Bowman et al. |
| 2018/0163905 A1 | 6/2018 | Ohnemus et al. |
| 2018/0163906 A1 | 6/2018 | Ohnemus et al. |

FOREIGN PATENT DOCUMENTS

| | | |
|---|---|---|
| GB | 2490598 A | 11/2012 |
| WO | 2010141948 A1 | 12/2010 |
| WO | 2011109719 A1 | 9/2011 |

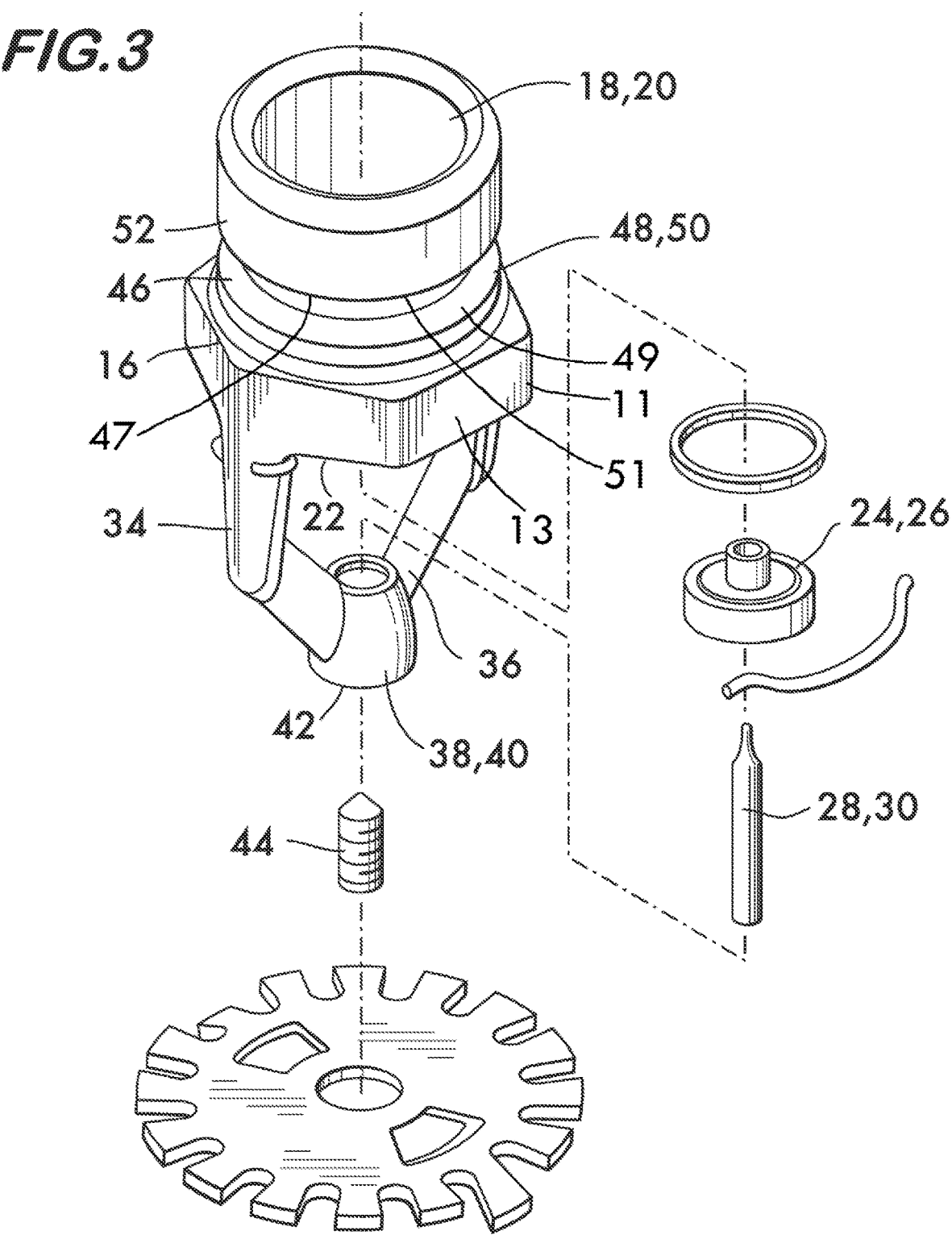

DIRECT COUPLING COMPATIBLE SPRINKLER

CROSS REFERENCE TO RELATED APPLICATIONS

This application claims benefit of priority to and is a continuation of U.S. patent application Ser. No. 16/663,439, filed Oct. 25, 2019, which is a divisional of U.S. patent application Ser. No. 15/671,575, filed Aug. 8, 2017, now U.S. Pat. No. 10,471,288, issued Nov. 12, 2019, which application is based upon and claims priority to U.S. Provisional Application No. 62/448,105, filed Jan. 19, 2017 and to U.S. Provisional Application No. 62/520,668, filed Jun. 16, 2017, all applications being hereby incorporated by reference.

FIELD OF THE INVENTION

This invention relates to sprinklers for fire suppression and couplings for connecting sprinklers to piping networks.

BACKGROUND

Attachment of sprinklers to pipe elements of a fire suppression system is time consuming and must be executed with care to ensure that: 1) a fluid tight joint is effected, 2) the relatively delicate sprinkler is in operating condition after it is installed, and 3) that certain regulatory requirements, such as rotational orientation, are met. Traditional sprinklers have a body with a nipple that has male threads which engage the female threads of an adapter fitting connected to the pipe element, usually also a threaded or welded attachment. These sprinklers generally also have a frame, or frame arms, extending from the body in a direction opposite the nipple. The frame or frame arms support a deflector that acts to appropriately distribute and disburse the fluid which is discharged by the sprinkler through a bore which extends through the body. These sprinklers are commonly oriented in any of an upright, pendent, or sidewall configurations. These configurations are distinguished by the direction of the axis of the bore of the sprinkler, and thus of the direction of the water discharged from the orifice at the end of the bore before it impinges upon the deflector, examples of those directions being vertically upwards, vertically downwards, and horizontally for the upright, pendent, and sidewall sprinklers, respectively. Further, the installation of certain types of sprinklers may require, for regulatory or functional reasons, that they be installed in a certain rotational orientation about their axis and relative to the space to be protected by the sprinkler. This rotational orientation requirement is different from the pendent, upright, or sidewall orientation of the sprinkler body (and thus of the axis), but refers to the rotational orientation of the sprinkler body about its axis, which affects the location of the frame, frame arms or the deflector. For instance, sidewall-type sprinklers typically have a deflector which is asymmetrical about the sprinkler's axis, and that acts to preferentially deflect the discharged fluid downwards and out of the sprinkler, while limiting the fluid from that is deflected upwards. The rotational alignment of such a deflector about the horizontal axis of the sprinkler body is critical to ensure adequate protection of the space where the sprinkler is installed. Additionally, certain regulations, including those promulgated by the National Fire Protection Agency (NFPA) require certain orientations for various types of sprinklers to ensure the desired and necessary performance.

Attachment of a traditional sprinkler to their adapter fittings requires that the technician ensure that each threaded joint is sealed and that the sprinkler is not damaged when handled or when torque is applied to seat the sprinkler during installation. The threaded joints for attaching sprinklers are commonly of the tapered thread type, which have a built-in interference which causes the threads to create a seal when they are sufficiently tightened. However, this seal can be compromised in many ways, including by damage to the threads, incomplete tightening, corrosion, or other forms of contamination of the mating surfaces. This attachment is further complicated by the rotational orientation requirement, where an installer not only has to ensure adequate tightness, but also the appropriate rotational orientation, which may mean tightening the sprinkler up to one full rotation more or less than might otherwise be desired. As these tapered threads require increasing torque with rotation, it may not be possible to achieve the appropriate orientation with additional tightening, causing the installer to 'back off' the sprinkler to a looser condition with the correct orientation, or risk damaging the sprinkler by overtightening it. In an attempt to mitigate any of the above conditions and promote more consistent attachment of sprinklers, installers will often use a thread sealant, such as pipe joint compound, or thread sealing tapes, to help promote a seal under less than ideal conditions; however, thread sealant or tape may exacerbate leakage issues where sprinklers are tightened and loosened repeatedly while trying to achieve the appropriate orientation. Use of sealants and tapes add time and expense to the installation process. Further, excess tape or compound may prevent the sprinkler from being threaded into the adapter fitting to the appropriate depth necessary for safe operation.

As the required leak-tight nature of sprinklers relies on interference inherent in tapered thread connections, combined with sealants and tapes when used, tightening often requires significant torque, especially as for sprinklers having large orifices, and, consequently larger bodies, such as those that are connected with ¾" or 1" National Pipe Thread or British Standard Pipe size threads. The need to apply significant torque in the vicinity of the sprinkler's delicate components, such as the deflector and, in automatic-type sprinklers, the fusible element that triggers the sprinkler (commonly a solder link or glass bulb), heightens the risk of damage to these components during assembly. Attempts to mitigate this risk include specialized wrenches and regulations that require covers, commonly called bulb protectors, be installed over the most delicate sprinkler components in order to shield them during installation. Example covers are disclosed in U.S. Pat. No. 7,273,189, hereby incorporated by reference.

There is clearly an opportunity to improve the installation of sprinklers by reducing the time required for installation, reducing the number of parts to be handled, reducing the likelihood of damage to the sprinkler, promoting more consistent sealing, and more easily achieving the required rotational orientation.

SUMMARY

The invention concerns a sprinkler adapted to receive arcuate surfaces of a grooved coupling. The sprinkler is retainable to the coupling in a pre-assembled state for joining the sprinkler in facing axial end-to-end relation directly to grooved pipe. In one example embodiment the sprinkler comprises a monolithic body defining a bore having an inlet and an outlet oppositely disposed. The bore is open at the inlet. A first arm extends from the body adjacent to the outlet. The first arm has an end positioned in spaced relation to the outlet. A closing member sealingly engages the outlet. A trigger is positioned between the end of the first arm and the closing member. The trigger permits opening of the closing member. A groove extends around the body. The groove is positioned in the body between the inlet and the outlet. The groove is adapted to receive the arcuate surfaces. A projection projects outwardly from the body. The projection is positioned between the groove and the outlet in this example embodiment.

By way of example the projection comprises a ring extending around the body. In an example embodiment a portion of the body comprises a cylindrical surface. The groove and the ring extend circumferentially around the surface. An example embodiment further comprises a second arm extending from the body adjacent to the outlet. The first and second arms meet to form an apex in spaced relation to the outlet. The trigger is positioned between the apex and the closing member. The trigger is heat sensitive and permits opening of the closing member in response to a specified temperature.

An example embodiment further comprises a boss. The boss extends circumferentially about the sprinkler from the first arm to the second arm. In an example embodiment the boss comprises a plurality of facets. By way of example the projection may be positioned between the groove and the boss. The groove comprises a floor. In an example embodiment the floor is substantially cylindrical. A first sidewall and a second sidewall of the groove are adjacent the floor and are angularly oriented relative to the floor. In an example embodiment one of the sidewalls is oriented substantially perpendicularly to the floor. In an example embodiment the trigger comprises a frangible bulb. By way of further example the trigger may comprise a solder link.

BRIEF DESCRIPTION OF THE DRAWINGS

FIG. 3 is an exploded isometric view of the sprinkler shown in FIG. 2;

DETAILED DESCRIPTION

Figure 1:
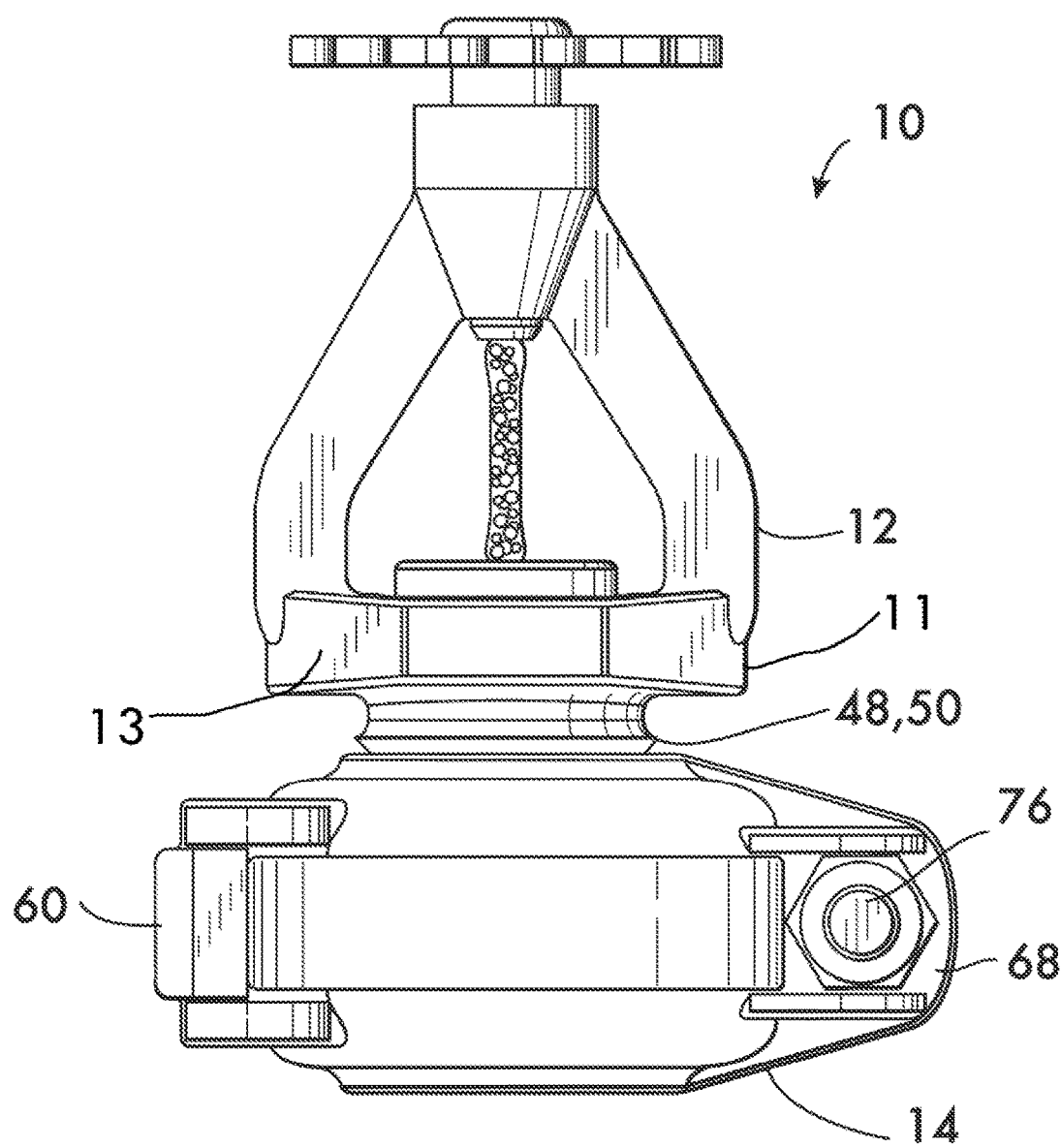
FIG. 1 is a side view of an example combination sprinkler and coupling according to the invention.

FIG. 1 shows an example embodiment of a combination sprinkler and coupling 10 according to the invention. Combination 10 comprises a sprinkler 12 connected to a grooved coupling 14 in a "pre-assembled state" as a user would preferably receive the combination 10 from the factory or distributor. The grooved coupling 14 allows the sprinkler 12 to be rapidly and securely joined in facing axial end-to-end relation directly to a grooved pipe of a piping network of a fire suppression system (see FIGS. 5 and 6) as explained below.

Figure 2:
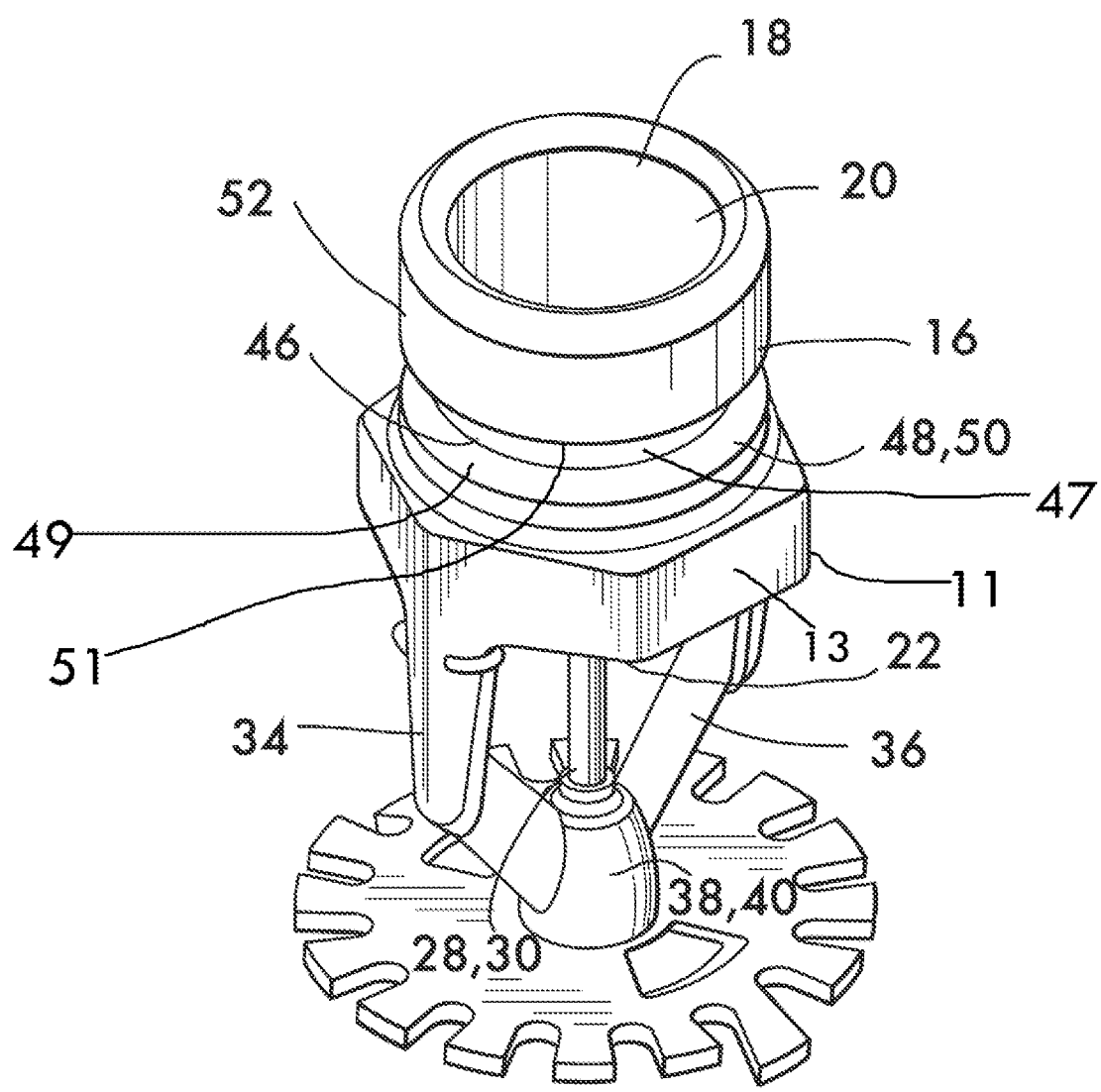
FIGS. 2 and 2A are isometric views of example sprinklers according to the invention.
Figure 2A:
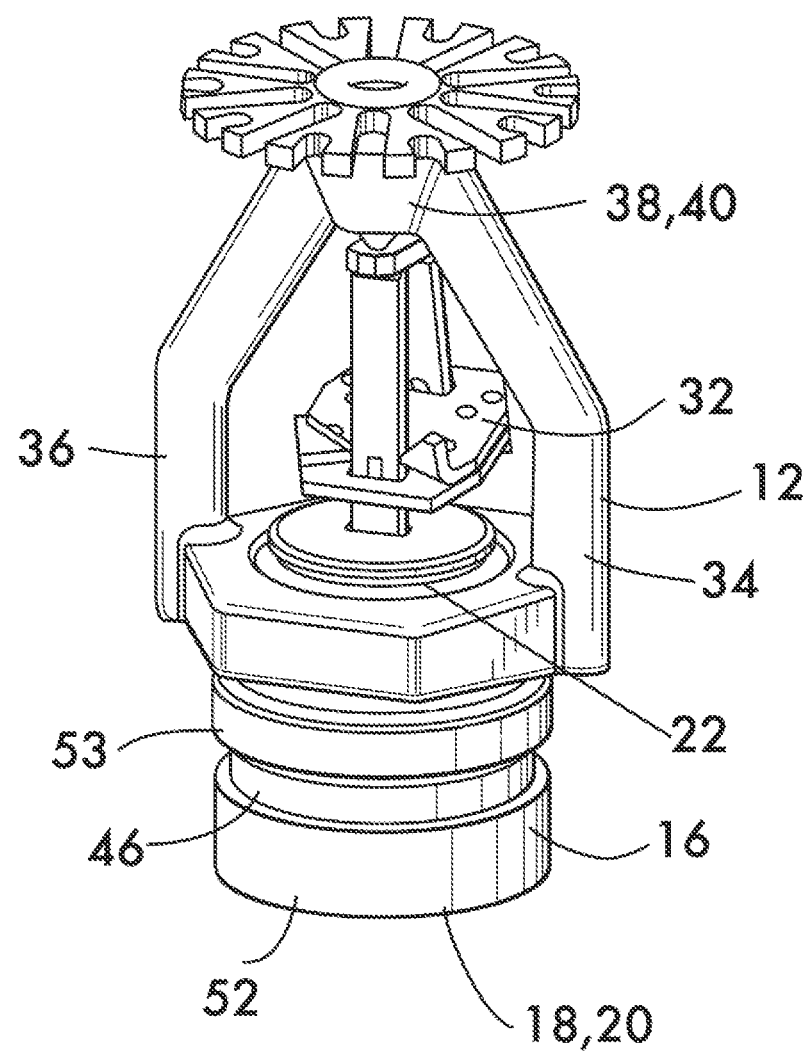

Sprinkler 12 is shown in FIGS. 2 and 3 and comprises a monolithic body 16 defining a bore 18. Body 16 defines an inlet 20 to the bore 18 and an outlet 22. Bore 18 is open at inlet 20. As shown in FIG. 3 a closing member 24 sealingly engages the outlet 22. In the example sprinkler 12 the closing member 24 comprises a disk 26. Disk 26 is maintained in sealing relationship with outlet 22 by a trigger 28. In the example shown the trigger is a heat sensitive trigger comprising a frangible glass bulb 30 filled with a heat sensitive liquid which expands when subjected to heat and breaks the bulb at a specified temperature to allow disk 26 to disengage from outlet 22, opening the outlet to permit water or other fire suppressing liquid to be discharged from the sprinkler. Other types of heat sensitive triggers, comprising, for example, a solder link 32 (shown in FIG. 2A), which melts at a specified temperature, are also feasible. Such triggers are disclosed in U.S. Pat. No. 7,584,803, which patent is hereby incorporated by reference. In an alternative embodiment (not shown), sprinkler 12 is of the "open" type where no trigger 28 or closing member 24 is present to seal outlet 22, flow through the combination sprinkler and coupling 10 being controlled by a remote valve.

Glass bulb 30 (or solder link 32) is supported in engagement with disk 26 by at least a first arm 34, but more commonly, first and second arms 34, 36, which extend from body 16 adjacent to the outlet 22. Trigger 28 is positioned between the end of the first arm 34 and the closing member 24, or between the closing member and an apex 38 formed where first and second arms 34, 36 meet. Apex 38 is positioned in spaced relation to the outlet 22. In the example shown the arms 34, 36 are attached to a sleeve 40 positioned at the apex 38. Sleeve 40 has a threaded bore 42 which receives a set screw 44. Adjustment of set screw 44 controls the degree of compression of the glass bulb 30 (or the solder link 32) against the disk 26.

Body 16 also defines a circumferential groove 46 positioned between the inlet 20 and the outlet 22 and extending around the body 16. Groove 46 is circumferential to bore 18 and sized and positioned to receive projecting arcuate surfaces or "keys" for connecting the sprinkler 12 to the coupling 14 as described below. As shown in FIGS. 2 and 3, groove 46 comprises a substantially cylindrical floor 47 and first and second sidewalls 49 and 51 positioned adjacent to the floor. Sidewalls 49 and 51 are angularly oriented with respect to the floor 47. In this example at least one of the sidewalls is oriented substantially perpendicular to the floor 47.

A projection 48, in this example comprising a ring 50, extends around body 16 and projects outwardly therefrom. Projection 48 (ring 50 in this example) is positioned between groove 46 and outlet 22. Ring 50 acts as a "stop" to ensure proper location of the coupling's keys relative to groove 46, and to assist in the mounting of the combination sprinkler and coupling to a pipe element (described below). In the example sprinkler 12, at least a portion body 16 comprises a cylindrical surface 52 and the groove 46 and ring 50 extend circumferentially around the cylindrical surface. In another example embodiment, shown in FIG. 2A, the ring 50 comprises a shoulder 53 having a larger radius than the remainder of the cylindrical surface 52.

As further shown in FIGS. 1-3 sprinkler 12 comprises a boss 11 extending circumferentially about the sprinkler between the first and second arms 34 and 36. Boss 11 comprises a plurality of facets 13. In this example the projection 48 is positioned between the boss 11 and the groove 46.

Figure 4:
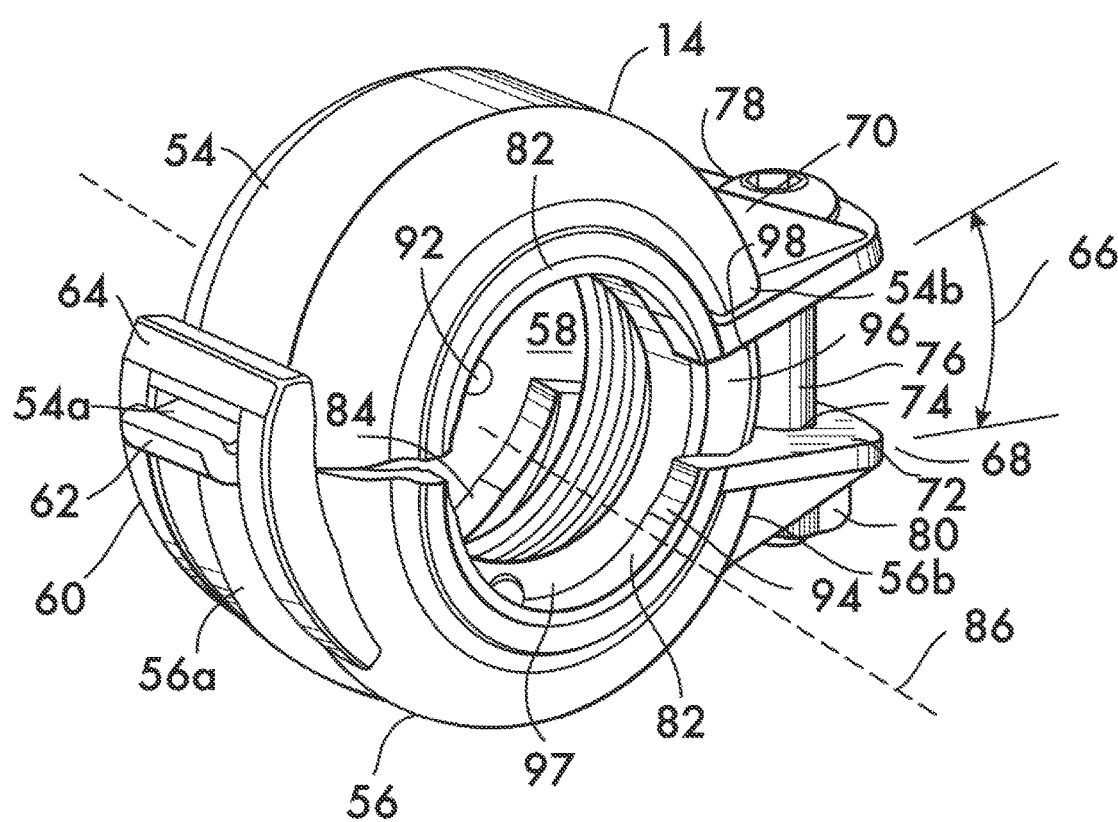
FIG. 4 is an isometric view of an example coupling according to the invention.

Coupling 14 is shown in FIG. 4 and comprises a plurality of segments, in this example first and second segments 54 and 56 arranged end to end surrounding a central space 58. As described below, the central space 58 receives the sprinkler 12 and a pipe element of a piping network of a fire suppression system. Each segment 54 and 56 has a first end (54*a*, 56*a*) and a second end (54*b*, 56*b*). A hinge 60 pivotably connects the first ends 54*a* and 56*a* of the segments 54 and 56 to one another. In this example, hinge 60 comprises a tongue 62 which projects from the first end 54*a* of the first segment 54 and engages a stirrup 64 projecting from the first end 56*a* of the second segment 56. Engagement of the tongue 62 and stirrup 64 permits pivoting motion of the segments 54 and 56 relative to one another while also connecting the first ends of the segments 54*a* and 56*a* to one another through positive mechanical engagement. Other forms of hinge are of course feasible. Hinge 60 permits the segments 54 and 56 to have a separation, which, in the examples shown herein, is represented by a variable separation angle 66, as described below.

An adjustable attachment assembly 68 is positioned at the second ends 54*b* and 56*b* of segments 54 and 56. In the example embodiment shown, the attachment assembly 68 comprises a first lug 70 extending from the second end 54*b* of the first segment 54, and a second lug 72 extending from the second end 56*b* of the second segment 56. Lugs 70 and 72 define respective through holes 74 which receive an adjustable fastener 76, for example bolt 78 and nut 80. Tightening of the fastener 76 draws the segments 54 and 56 toward one another, the segments pivoting about hinge 60 and establishing the separation angle 66 as described below.

Figure 5:
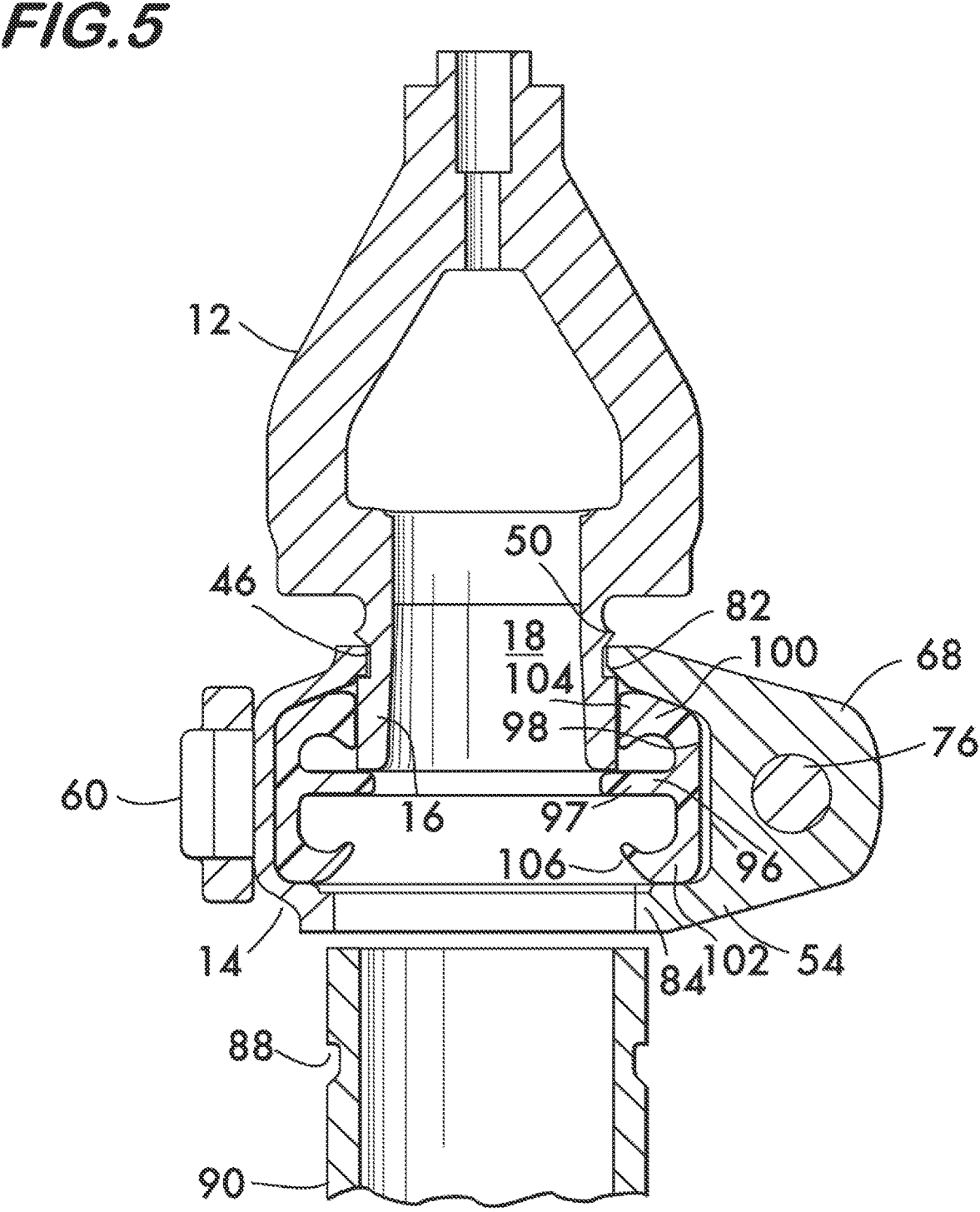
FIGS. 5, 6 and 7 are longitudinal sectional views illustrating connection of a combination sprinkler and coupling to a pipe element according to the invention.
Figure 6:
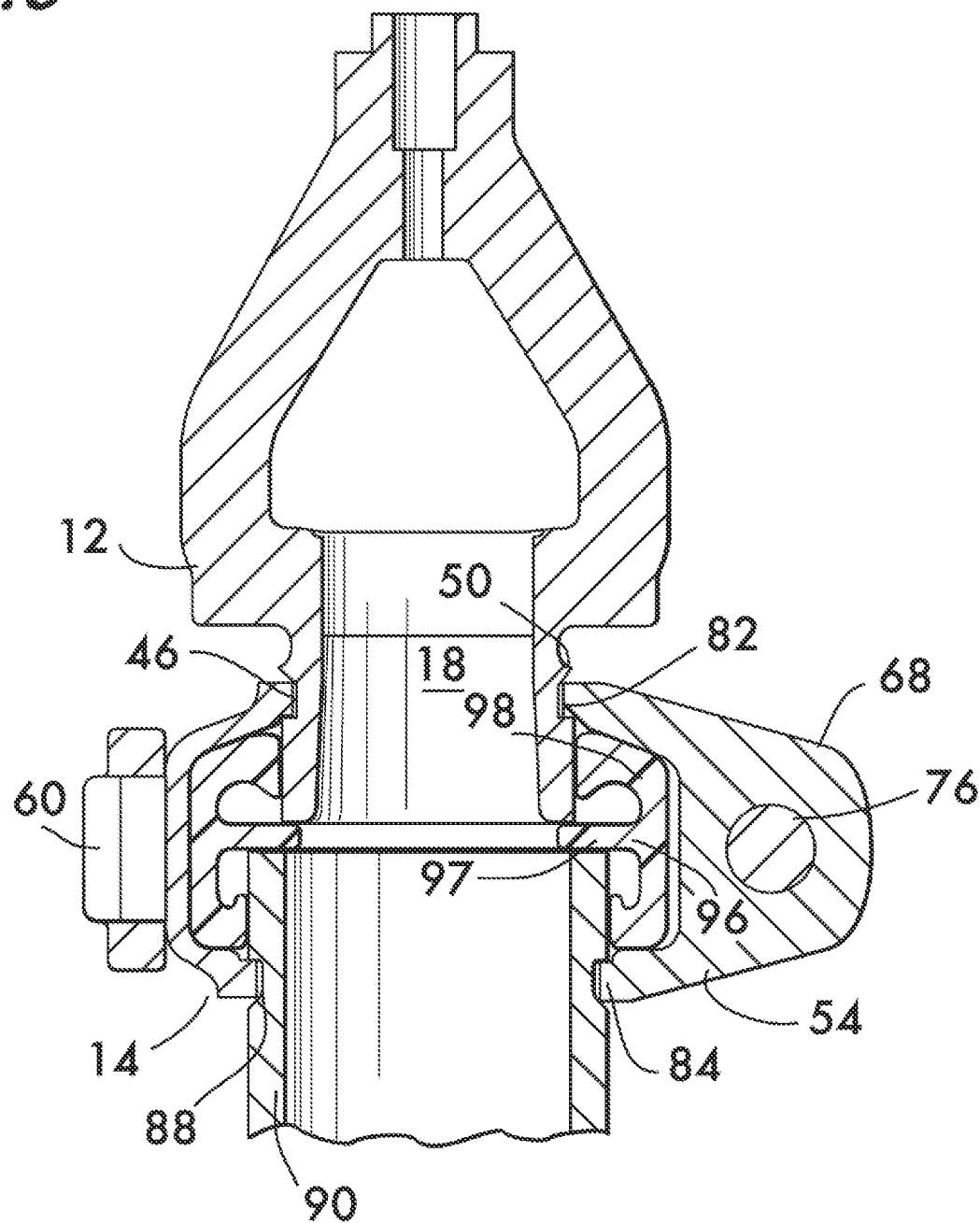

FIG. 4 also shows the arcuate surfaces or keys 82 and 84. Keys 82 and 84 are positioned on opposite sides of each segment 54 and 56 and project toward an axis 86 which passes coaxially through the central space 58. As shown in FIGS. 5 and 6, keys 82 of segments 54 and 56 (54 shown) are sized to engage the circumferential groove 46 in body 16; keys 84 are sized to engage a circumferential groove 88 in a pipe element 90. In the embodiment shown in FIGS. 5 and 6, the body 16 has a smaller radius than the pipe element 90. Consequently, to engage with the groove 46 in the body 16, keys 82 have a smaller radius of curvature than keys 84, which have a larger radius of curvature designed to engage a groove 88 in the pipe element 90. In some embodiments, shown for example as combination 108 in FIGS. 8-11, the body 16 of sprinkler 12 has a radius that is the equal or similar to the diameter of the pipe element 90, and the keys 82, 84 on opposite sides of the segments may be of equal or similar radius of curvature to one another. Pipe element 90 may, for example, be part of a piping network for a fire suppression system (not shown). As shown in FIG. 4, keys 82 and 84 may also have at least one tooth 92 extending toward the axis 86. Tooth or teeth 92 are sized to slightly interfere with body 16 within groove 46 (in the case of keys 82), or with pipe element 90 within the groove 88 (in the case of keys 84), providing additional rigidity and torsional resistance to the assembly. One or more teeth 92 positioned proximate to the hinge 60 also permits a larger separation angle 66 while still engaging and retaining the sprinkler 12 in the central space 58. Keys 82 and 84 may further have relief cutouts 94 positioned upon and projecting along a portion of each of keys 82 and 84 proximate to their ends. Relief cutouts 94 reduce the separation angle 66 subtended by the segments 54 and 56 required for a pipe element 90 or a sprinkler body 16 to be inserted into the central space 58. Relief cutouts 94 may project along a greater proportion of keys 82 and 84 proximate to hinge 60, where segments 54 and 56 are closer together (by virtue of separation angle 66) than they project on keys 82 and 84 proximate to adjustable fastener 74, where segments 54 and 56 are further apart. In embodiments where the keys on opposite sides of the segments have equal or similar radii of curvature, relief cutouts 94 may project along the same proportion of each of the keys. In the embodiment depicted in FIG. 4, where keys 82 and 84 are of different radii of curvature, relief cutouts 94 may project along a greater proportion of one of the keys 82 than the other key 84 (shown).

As shown in FIGS. 4 and 5, an annular seal 96 is located within the central space 58. Seal 96 is formed of a flexible, resilient material, for example, an elastomer such as EPDM and has an outer surface 98 sized to support segments 54 and 56 at a desired separation angle 66. For the example combination 10 of sprinkler 12 and coupling 14 shown in FIGS. 1 and 5, the desired separation angle 66 is such that the coupling 14 retains the sprinkler 12 by at least partial engagement between the coupling keys 82 and the groove 46 in the body 16 while allowing sufficient separation of the keys 84 (on the opposite side of the segments) to permit insertion of the pipe element 90 into the central space 58 (see FIG. 6). For this embodiment, the combination sprinkler and coupling 10 is said to be in the "pre-assembled" state, which permits the combination 10 to be easily installed into a piping network by inserting the pipe element into the central space and tightening the fastener as described below. For the combination sprinkler and coupling 108 shown in FIG. 8-11, where the body 16 and the pipe element 90 have equal or close radii, the desired separation angle 66 is one which will allow insertion of both the sprinkler 12 and the pipe element into the central space 58.

Annular seal 96 further comprises first and second lobes 100 and 102 positioned on opposite sides of the seal (see FIG. 5). Lobes 100 and 102 extend toward axis 86 and each has a respective conical surface 104 and 106. Conical surface 104 is sized to receive and sealingly engage the body 16 and conical surface 106 is sized to receive and sealingly engage the pipe element 90. In the embodiment shown the lobes form glands which use the internal pressure within the coupling 14 to enhance the sealing effect between the seal 96 and the body 16 and the pipe element 90. Lobes 100 and 102 may further be sized so that they compressively grip and retain the sprinkler 12 to the coupling 14 and/or the coupling to the pipe element 90 upon insertion of these elements into the central space 58 and before the adjustable attachment assembly 68 is tightened. The compressive gripping by the lobes 100 and 102 is due to the elastic, resilient, and frictional nature of the seal 96 and aids in the formation of the sprinkler and coupling into the pre-assembled state as well as aiding in the installation of the combination sprinkler and coupling into a piping network.

Annular seal 96 may also comprise a tongue 97, projecting radially inwardly toward axis 86. Tongue 97 may serve as a stop which aids in the location of sprinkler 12 within the coupling 14, or in the installation of combination sprinkler and coupling 10 over pipe element 90, where tongue 97 serves as a stop to aid the proper location of combination sprinkler and coupling 10 relative to groove 88 of the pipe element 90. In the embodiment of FIGS. 5 and 6, where body 16 has a smaller radius than that of pipe element 90, tongue 97 may only project radially inwards far enough to serve as an aid to the location of pipe element 90 relative to combination sprinkler and coupling 10. In the embodiment shown in FIGS. 9 and 10, where body 16 has the same or a similar radius as pipe element 90, tongue 97 may serve as an aid to the location of both sprinkler 12 and pipe element 90 within coupling 14. Further, in this embodiment, tongue 97 serves to help prevent sprinkler 12 from being dislodged from the combination sprinkler and coupling 10 during the installation process, when tongue 97 serves as a stop that controls the extent to which the combination sprinkler and coupling may be placed over pipe element 90 (as discussed below).

A method of preparing a combination sprinkler 12 and coupling 14 in a pre-assembled state (see FIGS. 1 and 4) includes attaching the first ends 54a and 56a of the first and second segments 54 and 56 to one another using the hinge 60. The annular seal 96 is positioned between the first and second segments 54 and 56. Body 16 is inserted into engagement with lobe 100, engaging its surface 104 where it is compressively retained. The second ends 54b and 56b of segments 54 and 56 are attached to one another using the adjustable attachment assembly 68. Attachment assembly is then adjusted, for example by tightening the fastener 76 extending between the lugs 70 and 72, to a desired separation angle 66. In the example combination 10 shown in FIGS. 1, 4 and 5, where the radius of body 16 is smaller than the radius of the pipe element 90, the desired separation angle 66 is such that at least a portion of the keys 82 (for example a tooth or teeth 92) engage the groove 46 in body 16 to retain the sprinkler 12 to the coupling 14 while still permitting sufficient separation between the segments 54 and 56 to allow the pipe element 90 to be inserted into the central space 58 without disassembling the combination sprinkler and coupling. In the example combination 108 shown in FIG. 8-11 where the radii of the body 16 and the pipe element 90 are equal or similar in size, the desired separation angle 66 is set to permit insertion of both the body 16 and the pipe element 90 into the central space, retention of the sprinkler 12 to the coupling 14 in the pre-assembled state depending on the compressive grip of the lobe 100. In either embodiment, the outer surface 98 of the seal 96 is sized so that fastener 76 may be tightened to compress the seal between the segments 54 and 56 so that the segments do not pivot loosely about hinge 60 during shipping and handling, which might result in the dislodgement of body 16.

Installation of the combination sprinkler and coupling 10 is described with reference to FIGS. 1, 5 and 6. As shown in FIGS. 1 and 5, the combination 10 is provided in its pre-assembled state. In this state, the segments 54 and 56 are pivoted toward the central space 58 and held in position by fastener 76 to the degree that keys 82 on one side of segments 54 and 56 are in close juxtaposition with the groove 46 on the body 16, while at the same time providing sufficient separation between keys 84 on the opposite sides of segments 54 and 56 to permit insertion of pipe element 90 into the central space 58 without adjusting the separation angle 66 of the segments. Keys 84, or a tooth 92 may partially engage groove 46 in this example combination 10. The segments 54 and 56 are supported in the pivoted, spaced apart relation by the annular seal 96 positioned between the segments. The outer surface 98 of the seal 96 engages and supports the segments 54 and 56 and the seal 96 acts as a spring, biasing the segments outwardly away from the central space 58 against the closing force applied by the fastener 76 when it is tightened. The segments 54 and 56 may also be supported by other arrangements, for example, by one or more spring elements extending between the lugs 70 and 72 (not shown). The first lobe 100 projecting toward the axis 86 grips the body 16 with sufficient force to prevent the sprinkler 12 from being easily withdrawn from the coupling 14, and ring 50, projecting radially outward from body 16, prevents body 16 from being inserted too deeply into coupling 14. Lobe 100 and ring 50 thus cooperate with the close juxtaposition of keys 82 with groove 46 to prevent twisting or bending forces from separating the sprinkler from the coupling 14 or locating it to deeply within coupling 14.

Figure 7:
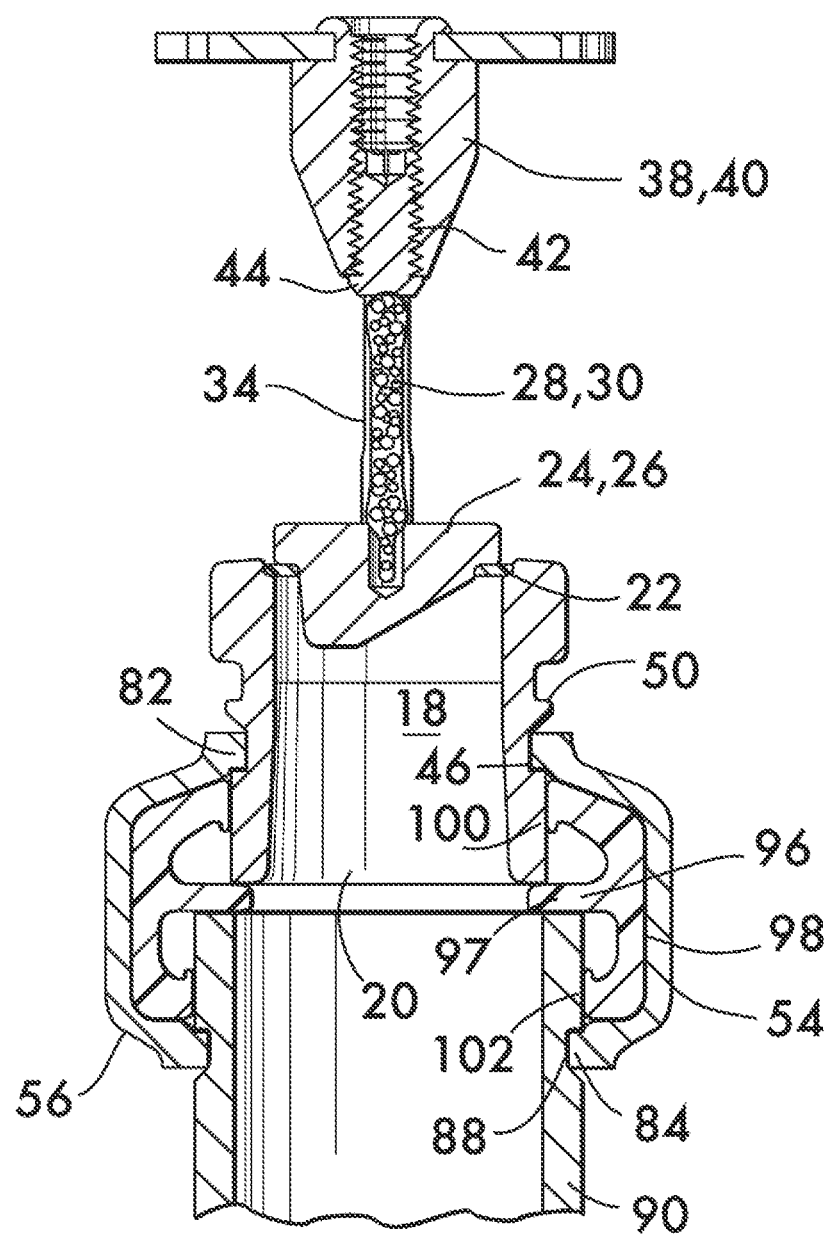
Figure 8:
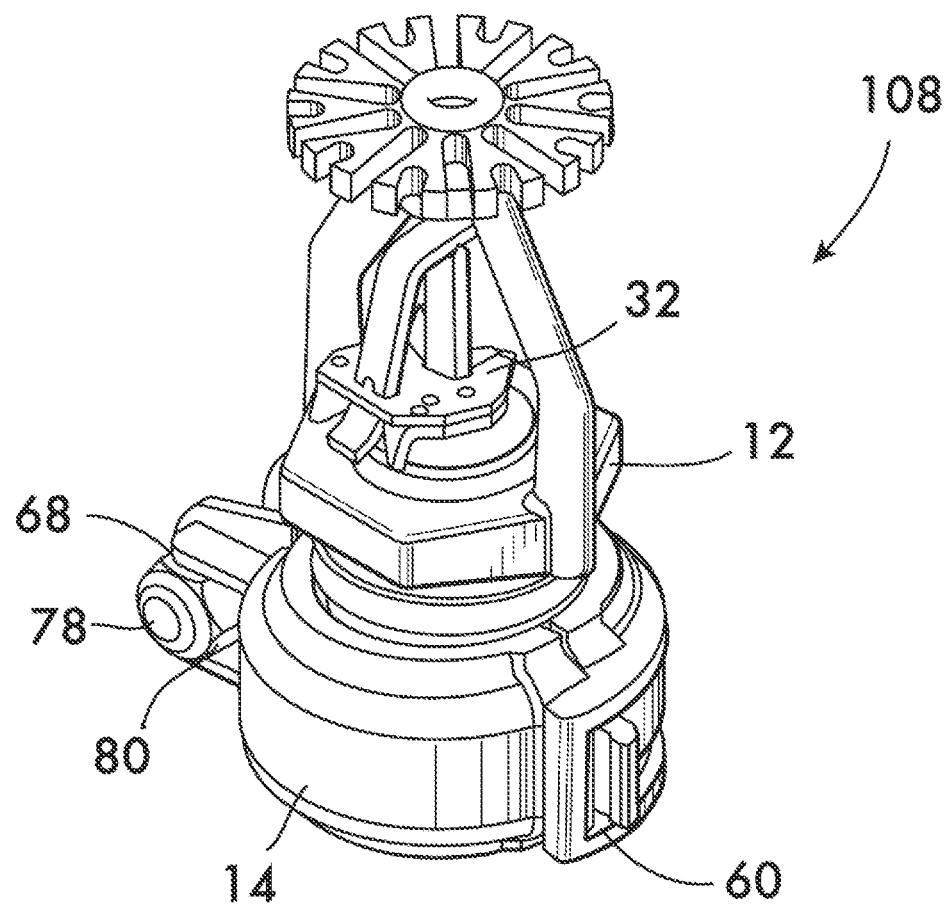
FIG. 8 is an isometric view of an example embodiment of a combination sprinkler and coupling according to the invention.

As shown in FIGS. 5 and 6, with the keys 82 of the segments 54 and 56 (54 shown) in close juxtaposition with groove 46 in the body 16, the combination sprinkler and coupling 10 is grasped by the user and axially placed over pipe element 90, which enters the central space 58. As the user is likely to grasp the combination sprinkler and coupling and apply the necessary force to some extent through the sprinkler 12 (or to a bulb protector, if so equipped), ring 50 acts as a stop and ensures that the sprinkler 12 remains appropriately located within coupling 14 so that key 82 is aligned with groove 46. Ring 50 also allows the insertion force caused by interaction between the second lobe 102 and the pipe element 90 to be transferred from the sprinkler 12, through coupling 14, in order to push the combination sprinkler and coupling over pipe element 90 until it is appropriately located with key 84 aligned with groove 88 and pipe element engaged with the second lobe 102 of seal 96. Engagement of tongue 97 with pipe element 90 acts as a stop for the location of pipe element 90, the resistance of which serves to provide tactile feedback to the user that the combination sprinkler and coupling is appropriately located relative to pipe element 90 such that keys 84 are appropriately positioned relative to groove 88. Insertion is shown at FIG. 6 where the pipe element 90 clears the keys 84 and engages the seal 96. Fastener 76 (in this example, bolt 78 and nut 80, see FIG. 4) is then tightened to pivot the segments 54 and 56 about hinge 60 to fully engage keys 82 with groove 46 in body 16 and keys 84 with groove 88 in pipe element 90 as shown in FIG. 7. In embodiments where projections such as teeth 92 are located on keys 82 and/or 84, tightening of fastener 76 also drives those projections into the body 16 and the pipe element 90 within their respective grooves. As the segments 54 and 56 pivot, seal 96 is compressed between the segments and the body 16 and the pipe element 90 to form a fluid tight connection between the combination 10 and the pipe element 90. Appropriate rotational orientation of the combination sprinkler and coupling may be achieved by orienting the sprinkler and coupling 10 before insertion of the pipe element 90, or, it may be achieved and/or adjusted after insertion of pipe element 90 but prior to fully tightening fastener 76.

Figure 9:
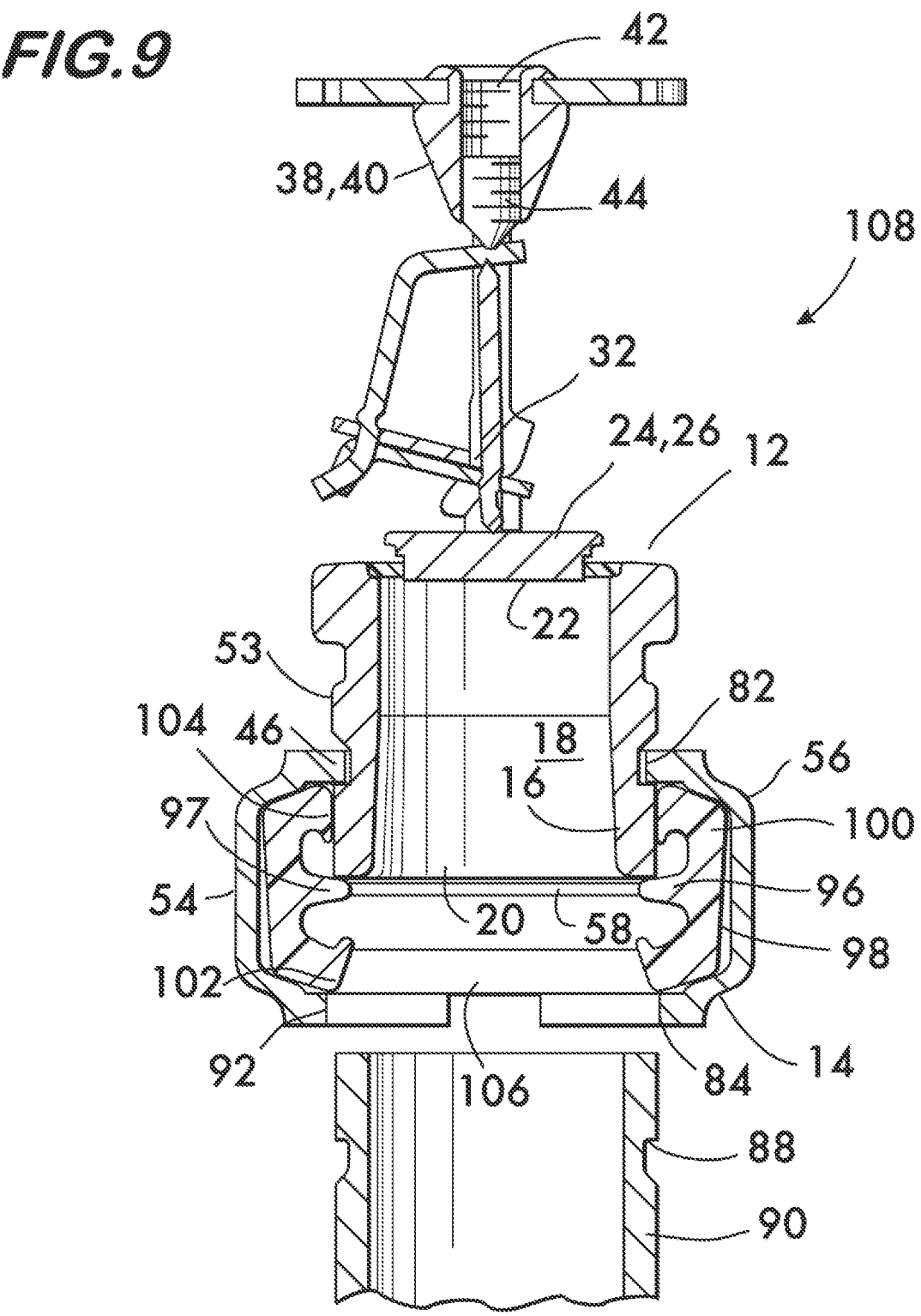
FIGS. 9, 10 and 11 are longitudinal sectional views illustrating connection of a combination sprinkler and coupling to a pipe element according to the invention.
Figure 10:
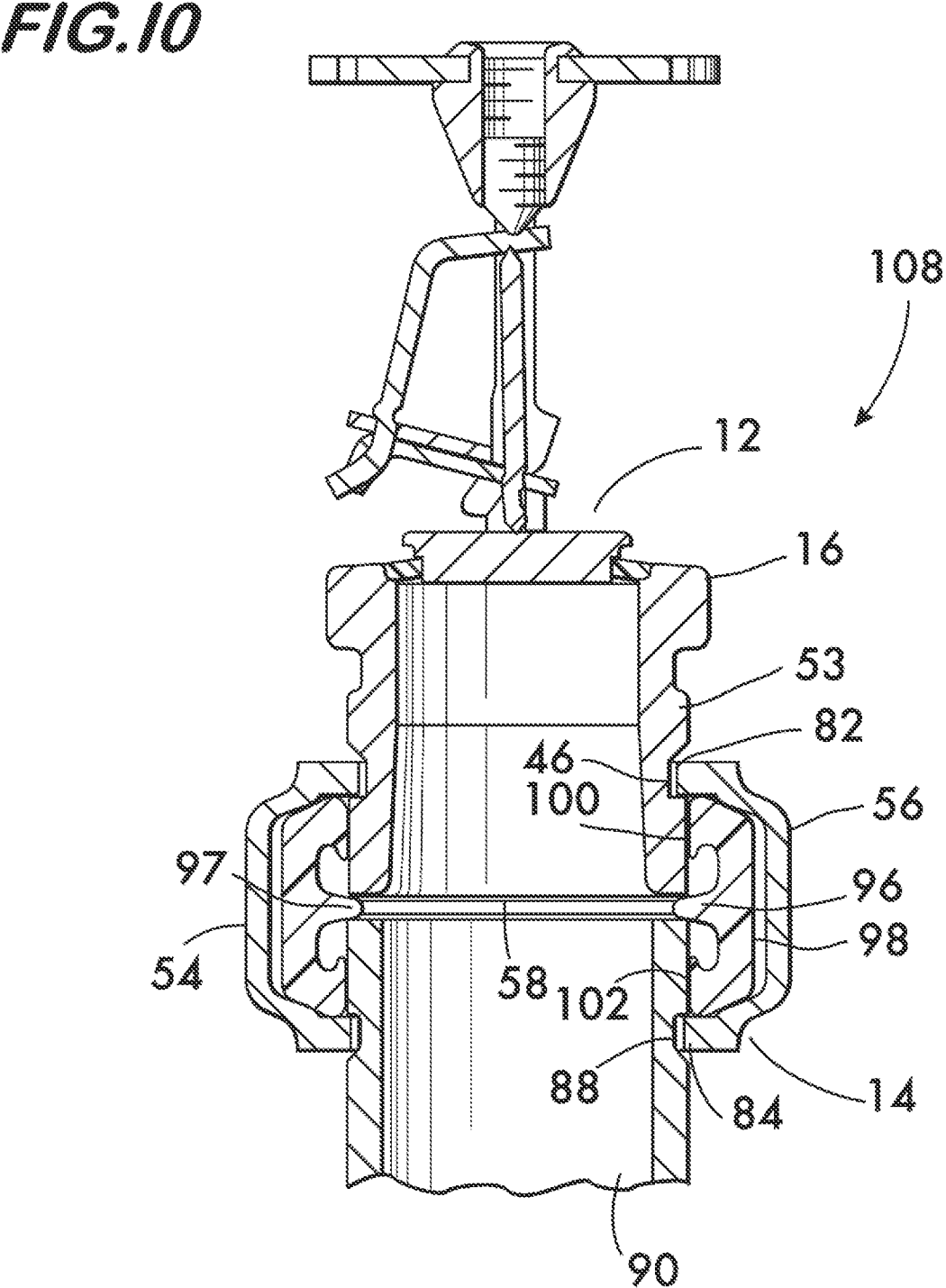
Figure 11:
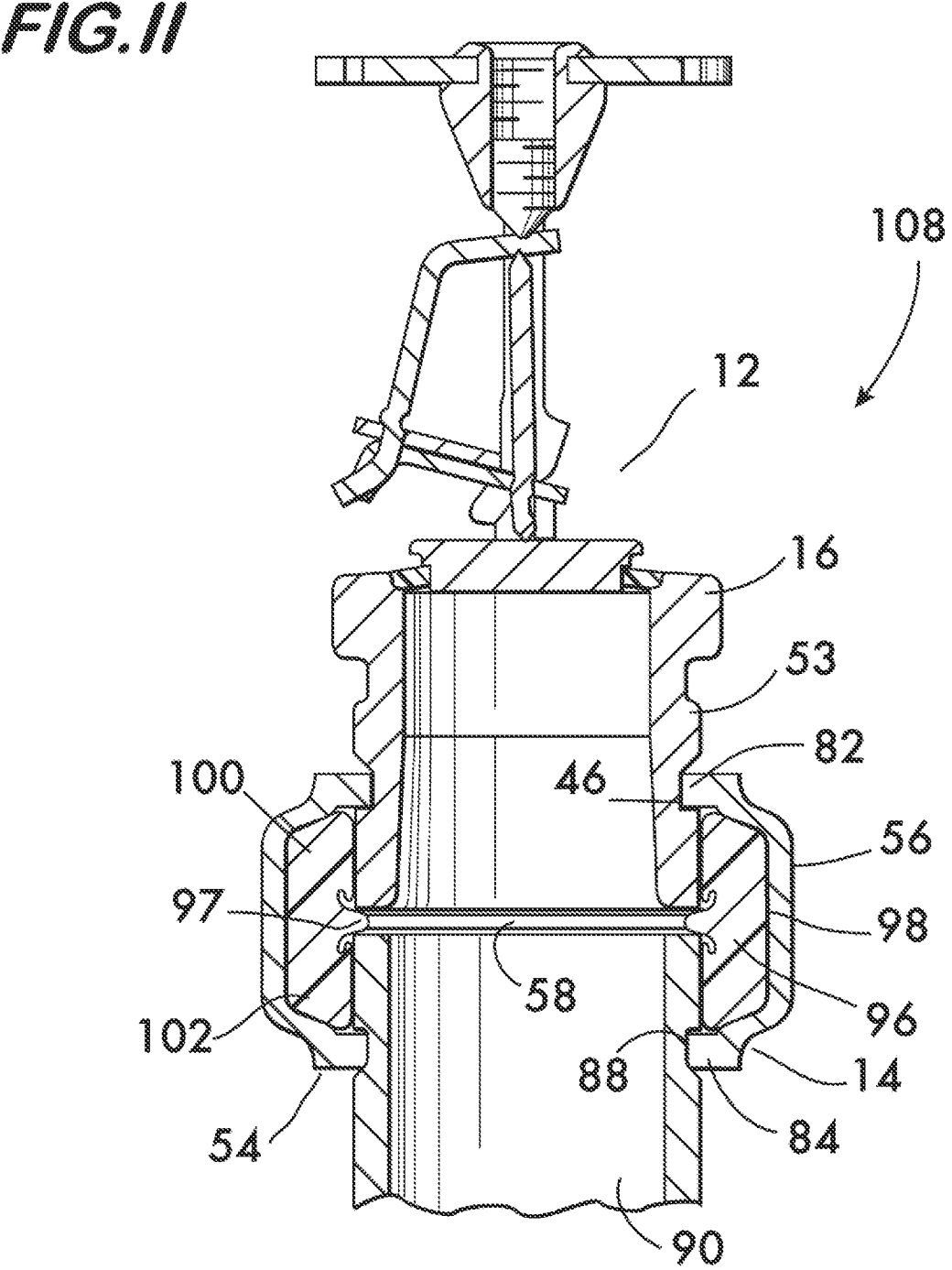

FIGS. 9-11 illustrate installation of the pre-assembled combination 108 (see FIG. 8) wherein the body 16 and the pipe element 90 have equal or similar radii. With the segments 54 and 56 in spaced relation sufficient to permit insertion into the central space 58 of both the body 16 and the pipe element 90, the combination sprinkler and coupling 108 is grasped by the user and axially placed over pipe element 90, which enters the central space 58. As the user is likely to grasp the combination sprinkler and coupling 108 and apply the necessary force to some extent through the sprinkler 12 (or to a bulb protector, if so equipped), shoulder 53 acts as a stop and ensures that the sprinkler 12 remains appropriately located within coupling 14 so that key 82 is aligned with groove 46. Shoulder 53 also allows the insertion force caused by interaction between the second lobe 102 and the pipe element 90 to be transferred from the sprinkler 12, through coupling 14, in order to push the combination sprinkler and coupling over pipe element 90 until it is appropriately located with key 84 aligned with groove 88 and pipe element engaged with the second lobe 102 of seal 96. Engagement of tongue 97 with pipe element 90 acts as a stop for the location of pipe element 90, the resistance of which serves to provide tactile feedback to the user that the combination sprinkler and coupling is appropriately located relative to pipe element 90 such that keys 84 are appropriately positioned relative to groove 88. In this embodiment, where body 16 and pipe element 90 have equal or similar radii, tongue 97 also serves to prevent pipe element 90 from passing through coupling 14 and possibly dislodging sprinkler 12. Insertion is shown at FIG. 10 where the pipe element 90 clears the keys 84 and engages the seal 96. Fastener 76 (in this example, bolt 78 and nut 80, see FIG. 8) is then tightened to pivot the segments 54 and 56 about hinge 60 to fully engage keys 82 with groove 46 in body 16 and keys 84 with groove 88 in pipe element 90 as shown in FIG. 11. In embodiments where projections such as teeth 92 are located on keys 82 and/or 84, tightening of fastener 76 also drives those projections into the body 16 and the pipe element 90 within their respective grooves. As the segments 54 and 56 pivot, seal 96 is compressed between the segments and the body 16 and/or the pipe element 90 to form a fluid tight connection between the combination 10 and the pipe element 90. Appropriate rotational orientation of the combination sprinkler and coupling may be achieved by orienting the sprinkler and coupling 10 before insertion of the pipe element 90, or, it may be achieved and/or adjusted after insertion of pipe element 90 but prior to fully tightening fastener 76.

The sprinkler, coupling, and combination sprinkler and coupling according to the invention are expected to provide a more efficient sprinkler installation with a reduced chance of damage to the sprinkler and its delicate trigger, reduce leakage attributable to the threaded connections, make it easier to achieve the appropriate rotational orientation, and also permit the sprinkler to be attached directly to the pipe element without the need for an intervening fitting between the sprinkler and the pipe element or the sprinkler and a coupling.

What is claimed is:

1. A sprinkler adapted to receive arcuate surfaces of a grooved coupling, said sprinkler being retainable to said coupling in a pre-assembled state for joining said sprinkler in facing axial end-to-end relation directly to a grooved pipe, said sprinkler comprising:
    a monolithic body defining a bore having an inlet and an outlet oppositely disposed, said bore being open at said inlet, and said inlet being separated from said grooved pipe by a gap therebetween to ensure said sprinkler and said pipe are joined by said coupling spaced apart in facing end-to-end relation;
    a first arm extending from said body adjacent to said outlet, said first arm having an end positioned in spaced relation to said outlet;
    a groove extending around said body, said groove being positioned in said body between said inlet and said outlet, said groove being adapted to receive said arcuate surfaces;
    a single closing member located distal of said groove and sealingly engaging said outlet; and
    a trigger positioned between said end of said first arm and said closing member, said trigger permitting opening of said closing member.

2. The sprinkler according to claim 1, wherein a portion of said body comprises a cylindrical surface, said groove extending circumferentially around said surface.

3. The sprinkler according to claim 1, further comprising:
    a second arm extending from said body adjacent to said outlet, said first and second arms meeting to form an apex in spaced relation to said outlet;
    said trigger being positioned between said apex and said closing member, said trigger being heat sensitive and permitting opening of said closing member in response to a specified temperature.

4. The sprinkler according to claim 3, further comprising a boss, said boss extending circumferentially about said sprinkler from said first arm to said second arm.

5. The sprinkler according to claim 4, wherein said boss comprises a plurality of facets.

6. The sprinkler according to claim 4, further comprising a projection projecting outwardly from said body between said groove and said outlet, wherein said projection is positioned between said groove and said boss.

7. The sprinkler according to claim 3, wherein said trigger comprises a frangible bulb.

8. The sprinkler according to claim 3, wherein said trigger comprises a solder link.

9. The sprinkler according to claim 1, said groove comprising a floor, said floor being substantially cylindrical, a first sidewall and a second sidewall adjacent said floor and being angularly oriented relative to said floor.

10. The sprinkler according to claim 9, wherein one of said sidewalls is oriented substantially perpendicularly to said floor.

11. The sprinkler according to claim 1, further comprising no more than one closing member for controlling flow therethrough.

12. The sprinkler according to claim 1, further comprising a projection projecting outwardly from said body between said groove and said outlet.

13. The sprinkler according to claim 12, wherein said projection comprises a ring extending around said body.

14. The sprinkler according to claim 12, wherein said projection comprises a surface angularly oriented with respect to an outer surface of said monolithic body.

* * * * *